(12) United States Patent
Broadway et al.

(10) Patent No.: US 11,555,288 B2
(45) Date of Patent: Jan. 17, 2023

(54) POWER RAKE AND MULTI-PURPOSE BUCKET COMBO ATTACHMENT

(71) Applicant: Construction Implements Depot, Inc., Denton, NC (US)

(72) Inventors: William Broadway, Monroe, NC (US); Hayden Bledsoe, Denton, NC (US); Jonathan Williams, Advance, NC (US)

(73) Assignee: CONSTRUCTION IMPLEMENTS DEPOT, INC., Denton, NC (US)

( * ) Notice: Subject to any disclaimer, the term of this patent is extended or adjusted under 35 U.S.C. 154(b) by 310 days.

(21) Appl. No.: 16/842,424

(22) Filed: Apr. 7, 2020

(65) Prior Publication Data

US 2020/0318312 A1    Oct. 8, 2020

Related U.S. Application Data

(60) Provisional application No. 62/830,534, filed on Apr. 7, 2019.

(51) Int. Cl.
| | |
|---|---|
| *E01H 1/04* | (2006.01) |
| *E02F 3/96* | (2006.01) |
| *E02F 3/413* | (2006.01) |
| *E02F 3/34* | (2006.01) |
| *E02F 3/40* | (2006.01) |
| *A01B 43/00* | (2006.01) |

(52) U.S. Cl.
CPC .............. *E02F 3/96* (2013.01); *E02F 3/3414* (2013.01); *E02F 3/413* (2013.01); *A01B 43/00* (2013.01); *E01H 1/04* (2013.01); *E02F 3/40* (2013.01); *E02F 3/404* (2013.01)

(58) Field of Classification Search
CPC . E02F 3/96; E02F 3/3414; E02F 3/402; E02F 3/404
See application file for complete search history.

(56) References Cited

U.S. PATENT DOCUMENTS

| | | |
|---|---|---|
| 2,705,082 A | 3/1955 | Heimsoth |
| 2,755,092 A | 7/1956 | Donahoe |
| 3,878,952 A | 4/1975 | Hueftle |
| 4,100,688 A | 7/1978 | Grist |
| 4,296,818 A | 10/1981 | Malinowski et al. |
| 4,364,434 A | 12/1982 | Erholm |
| 4,696,348 A | 9/1987 | Novoselsky |
| 5,060,732 A | 10/1991 | Baskett |
| 5,544,435 A | 8/1996 | Somero |

(Continued)

*Primary Examiner* — Ronald P Jarrett
(74) *Attorney, Agent, or Firm* — Jeffrey C. Watson; Grell & Watson Patent Attorneys LLC (57) ABSTRACT

A power rake and multi-purpose bucket combo attachment includes a power rake drum, a multi-purpose bucket and a frame. The multi-purpose bucket is configured to dig, scoop, lift, carry, clamp, pinch or hold. The frame is configured to hold the power rake drum and the multi-purpose bucket in positions for operation on a loader machine. The frame also includes a plate configured for attachment to a loader machine. Wherein, the power rake and multi-purpose bucket combo attachment is configured to combine the power rake drum and the multi-purpose bucket that can dig, scoop, lift, carry, clamp, pinch or hold in a single attachment, whereby the power rake multi-purpose bucket combo attachment provides operations of both the power rake drum and the multi-purpose bucket.

19 Claims, 9 Drawing Sheets

(56) References Cited

U.S. PATENT DOCUMENTS

| | | | |
|---|---|---|---|
| 5,564,506 A | 10/1996 | Foster et al. | |
| 5,592,761 A | 1/1997 | Ward | |
| 5,630,476 A | 5/1997 | Foster et al. | |
| 6,016,584 A * | 1/2000 | Melroe | E01H 1/056 15/82 |
| 6,990,758 B1 | 1/2006 | Holmes et al. | |
| 9,587,374 B1 | 3/2017 | Bennett | |
| 9,631,340 B2 | 4/2017 | Zimmerman | |
| 9,822,508 B2 | 11/2017 | Haveman | |
| 10,309,069 B1 * | 6/2019 | Smith | E01H 1/047 |
| 2008/0307681 A1 | 12/2008 | McNeil | |

\* cited by examiner

FIG. 7B ns, by providing a power rake and multi-purpose bucket attachment. Accordingly, in one aspect, the present disclosure embraces a power rake and multi-purpose bucket combo attachment that may generally include a power rake drum, a multi-purpose bucket, and a frame. The multi-purpose bucket may be configured to dig, scoop, lift, carry, clamp, pinch or hold. The frame may be configured to hold the power rake drum and the multi-purpose bucket in positions for operation on a loader machine. The frame may also include a plate configured for attachment to the loader machine. Wherein, the power rake and multi-purpose bucket combo attachment may be configured to combine the power rake drum and the multi-purpose bucket that can dig, scoop, lift, carry, clamp, pinch or hold in a single attachment. Whereby, the power
POWER RAKE AND MULTI-PURPOSE BUCKET COMBO ATTACHMENT

CROSS-REFERENCE TO RELATED APPLICATIONS

This application claims benefit of priority application U.S. Provisional Ser. No. 62/830,534 filed on Apr. 7, 2019, entitled "Power Rake Combo Attachment", which is incorporated herein by reference in its entirety.

FIELD OF THE DISCLOSURE

The present disclosure is related to attachments for loaders, like skid steer loaders, tractors, compact tractors, compact track loaders, mini skid steers, mini excavators, or the like. More specifically, the present disclosure is related to a power rake and multi-purpose bucket combo attachment for loaders, like skid steer loaders, tractors, compact tractors, compact track loaders, mini skid steers, mini excavators, or the like.

BACKGROUND

Generally speaking, a loader is a heavy equipment machine used in construction to move aside or load materials such as asphalt, demolition debris, dirt, snow, feed, gravel, logs, raw minerals, recycled material, rock, sand, woodchips, etc. into or onto another type of machinery (such as a dump truck, conveyor belt, feed-hopper, or railroad car). As such, a loader is a type of tractor, usually wheeled, sometimes on tracks, that has a front-mounted square wide bucket connected to the end of two booms (arms) to scoop up loose material from the ground, such as dirt, sand or gravel, and move it from one place to another without pushing the material across the ground. There are many types of loader, which, depending on design and application, are called by various names, including bucket loader, front loader, front-end loader, payloader, scoop, shovel, skip loader, wheel loader, or skid-steer.

The loader assembly may be a removable attachment or permanently mounted. Often the bucket can be replaced with other devices or tools. For example, many loaders can mount forks to lift heavy pallets or shipping containers, and a hydraulically opening "clamshell" bucket allows a loader to act as a light dozer or scraper. The bucket can also be augmented with devices like a bale grappler for handling large bales of hay or straw.

Skid-steer loaders are types of loaders that are typically four-wheel vehicles with the wheels mechanically locked in synchronization on each side, and where the left-side drive wheels can be driven independently of the right-side drive wheels. The wheels typically have no separate steering mechanism and hold a fixed straight alignment on the body of the machine. Turning is accomplished by differential steering, in which the left and right wheel pairs are operated at different speeds, and the machine turns by skidding or dragging its fixed-orientation wheels across the ground. Skid-steer loaders are capable of zero-radius, "pirouette" turning, which makes them extremely maneuverable and valuable for applications that require a compact, agile loader. Skid-steer loaders are sometimes equipped with tracks instead of the wheels, and such a vehicle is known as a multi-terrain loader or more simply as a track loader. Like other front loaders, skid-steer loaders can push material from one location to another, carry material in its bucket or load material into a truck or trailer.

The conventional bucket of many skid-steer loaders can be replaced with a variety of specialized buckets or attachments, many powered by the loader's hydraulic system. These include backhoe, hydraulic breaker, pallet forks, angle broom, sweeper, auger, mower, snow blower, stump grinder, tree spade, trencher, dumping hopper, pavement miller, ripper, tillers, grapple, tilt, roller, snow blade, wheel saw, cement mixer, and wood chipper machine.

For landscaping, as examples, the main attachments of a skid-steer loader, or the like, may be a 4-in-1 multipurpose bucket and a powered landscape rake. A 4-in1 multipurpose bucket can be an ideal tool for a landscape contractor, large property owner, rental yard, park & recreation department or turf management professional as it can be used as a normal bucket as well as a dozer blade, leveler or a grab. The front part of the 4-in-1 multi purpose bucket opens with 2 hydraulic cylinders located on the back side of the bucket, which enables dozing, levelling and picking of stones, tree stumps etc. A powered landscape rake or Harley rake can also be an ideal tool for the landscape contractors, large property owner, rental yard, park & recreation department or turf management professional, as they can be used to prep, smooth, set grade, level, till, remove rocks and create a seedbed.

The instant disclosure recognizes the problem with these types of landscaping applications where the need to change between the multipurpose 4-in-1 bucket and the powered landscape rake happens many times during many projects, which requires the loader to be down or not operating for extended periods of time at multiple times during a job. This is obviously undesirable as it is inefficient, time consuming, and thus adds unneeded time and costs to the overall job or project. As an example, with previous power rakes an operator would use the power rake, creating piles of debris around the work area, then switch to a bucket to pick up the piles, then dispose of them, and then switch back to the power rake to clean up tracks left by the machine, which is obviously a timely process. Therefore, to improve efficiency of such landscaping jobs or projects, a need exists for an attachment with the combination of a multipurpose 4-in-1 bucket and a powered rake to reduce the downtime of the loader from switching attachments.

The instant disclosure is designed to address at least certain aspects of the problems or needs discussed above by providing a power rake and multi-purpose bucket combo attachment.

SUMMARY

The present disclosure solves the aforementioned limitations of the currently available loader attachments, by providing a power rake and multi-purpose bucket attachment. Accordingly, in one aspect, the present disclosure embraces a power rake and multi-purpose bucket combo attachment that may generally include a power rake drum, a multi-purpose bucket, and a frame. The multi-purpose bucket may be configured to dig, scoop, lift, carry, clamp, pinch or hold. The frame may be configured to hold the power rake drum and the multi-purpose bucket in positions for operation on a loader machine. The frame may also include a plate configured for attachment to the loader machine. Wherein, the power rake and multi-purpose bucket combo attachment may be configured to combine the power rake drum and the multi-purpose bucket that can dig, scoop, lift, carry, clamp, pinch or hold in a single attachment. Whereby, the power rake multi-purpose bucket combo attachment may provide operations of both the power rake drum and the multi-purpose bucket.

One feature of the disclosed power rake and multi-purpose bucket combo attachment may be that the multi-purpose bucket can be configured to dig, scoop, lift, carry, clamp, pinch and hold. In select embodiments, the multi-purpose bucket configured to dig, scoop, lift, carry, clamp, pinch and hold may be a 4-N-1 bucket. In other select embodiments, the multi-purpose bucket may include a back portion and a front portion. The back portion may be affixed to the frame. The front portion may be pivotally connected to the back portion at a pivot point. In select embodiments, hydraulic cylinders may be included in the multi-purpose bucket of the attachment. The hydraulic cylinders may be configured to control the movement of the front portion relative to the back portion about the pivot point.

In select embodiments of the disclosed power rake and multi-purpose bucket combo attachment, the front portion of the multi-purpose bucket may include sides, a bucket bottom and an inner bottom. The sides may have a top gusset configured for strengthening a top portion of the sides with the pivot point. The bucket bottom may have two cutting edges. In select embodiments, the two cutting edges can include a front cutting edge at the front of the bucket bottom, and a rear cutting edge at the rear of the bucket bottom. A bottom gusset may also be positioned between the front cutting edge and the rear cutting edge configured for strengthening the bucket bottom between the front cutting edge and the rear cutting edge.

Another feature of the disclosed power rake and multi-purpose combo attachment may be the inclusion of bucket bolt-on side edges. The bucket bolt-on side edges may be on the front portion and may be configured for gripping.

In select embodiments of the disclosed power rake and multi-purpose bucket combo attachment, the back portion of the multi-purpose bucket may include an inner back, and an outer back. In these select embodiments, the hydraulic cylinders may be positioned between the inner back and the outer back.

In select embodiments of the disclosed power rake and multi-purpose bucket combo attachment, the power rake drum may be positioned approximate a bottom structure of the frame below the back portion. In these embodiments, the power rake drum may be positioned at a rear-bottom portion of the multi-purpose bucket.

In select embodiments of the disclosed power rake and multi-purpose bucket combo attachment, the power rake drum may include a pipe. The pipe may have a plurality of teeth. A shaft may be at a first end of the pipe. The shaft may be configured to spin in a bearing plate with a bearing housing. The bearing plate may be positioned on a bottom of a first side of the frame. A splined bushing may be positioned inside a hollow second end of the pipe. The splined bushing may be configured to attach to a splined rod of a hydraulic motor configured to spin the power rake drum. The hydraulic motor may be positioned on the bottom of a second side of the frame in a motor cradle. The motor cradle may be configured to secure the hydraulic motor to the frame and inside the hollow second end of the pipe. The hollow second end of the pipe may be sealed with round seals on the splined rod of the hydraulic motor configured to seal to the inside of the pipe.

In select embodiments of the disclosed power rake and multi-purpose bucket combo attachment, the frame may include steel tubing, an adjustable debris stopper, the bearing plate, and the motor cradle. The adjustable debris stopper may be movably attached on a bottom tubing of the frame configured for stopping debris from flying while the power rake drum is in use. The bearing plate with the bearing housing may be positioned on a bottom of a first side tube configured for holding the shaft at a first end of the power rake drum while allowing the shaft and power rake drum to spin. The motor cradle may be positioned at a bottom of a second side tube of the frame. The motor cradle may be configured to hold the hydraulic motor configured to spin the power rake drum.

Another feature of the disclosed power rake and multi-purpose bucket combo attachment may be that the plate configured for attachment to the loader machine on the frame may be a standard quick attachment plate.

In select embodiments of the disclosed power rake and multi-purpose bucket combo attachment may be that the loader machine may be a skid steer loaders, tractors, compact tractors, compact track loaders, mini skid steers, mini excavators, or the like.

In another aspect, the instant disclosure embraces the disclosed power rake and multi-purpose bucket combo attachment in any of the various embodiments or combination of embodiments shown and/or described herein.

In another aspect, the instant disclosure embraces a loader machine with the disclosed power rake and multi-purpose bucket combo attachment, including with the disclosed power rake and multi-purpose bucket combo attachment in any of the various embodiments or combination of embodiments shown and/or described herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-7, in a possibly preferred embodiment, the present disclosure overcomes the abovementioned disadvantages and meets the recognized need for such an apparatus, system or method by providing of the disclosed power rake and multipurpose bucket combo attachment 10. Power rake and multipurpose bucket combo attachment 10 may be referred to herein as just attachment 10. Attachment 10 may solve the aforementioned limitations of the currently available loader attachments, by providing an attachment with the combination of a power rake attachment and a multi-purpose bucket attachment, also known as a 4-N-1 bucket attachment or 4N1 bucket attachment. Attachment 10 may generally include power rake drum 12, multi-purpose bucket 14, and frame 16. These parts and their various embodiments and purposes are described in greater detail below.

Figure 1:
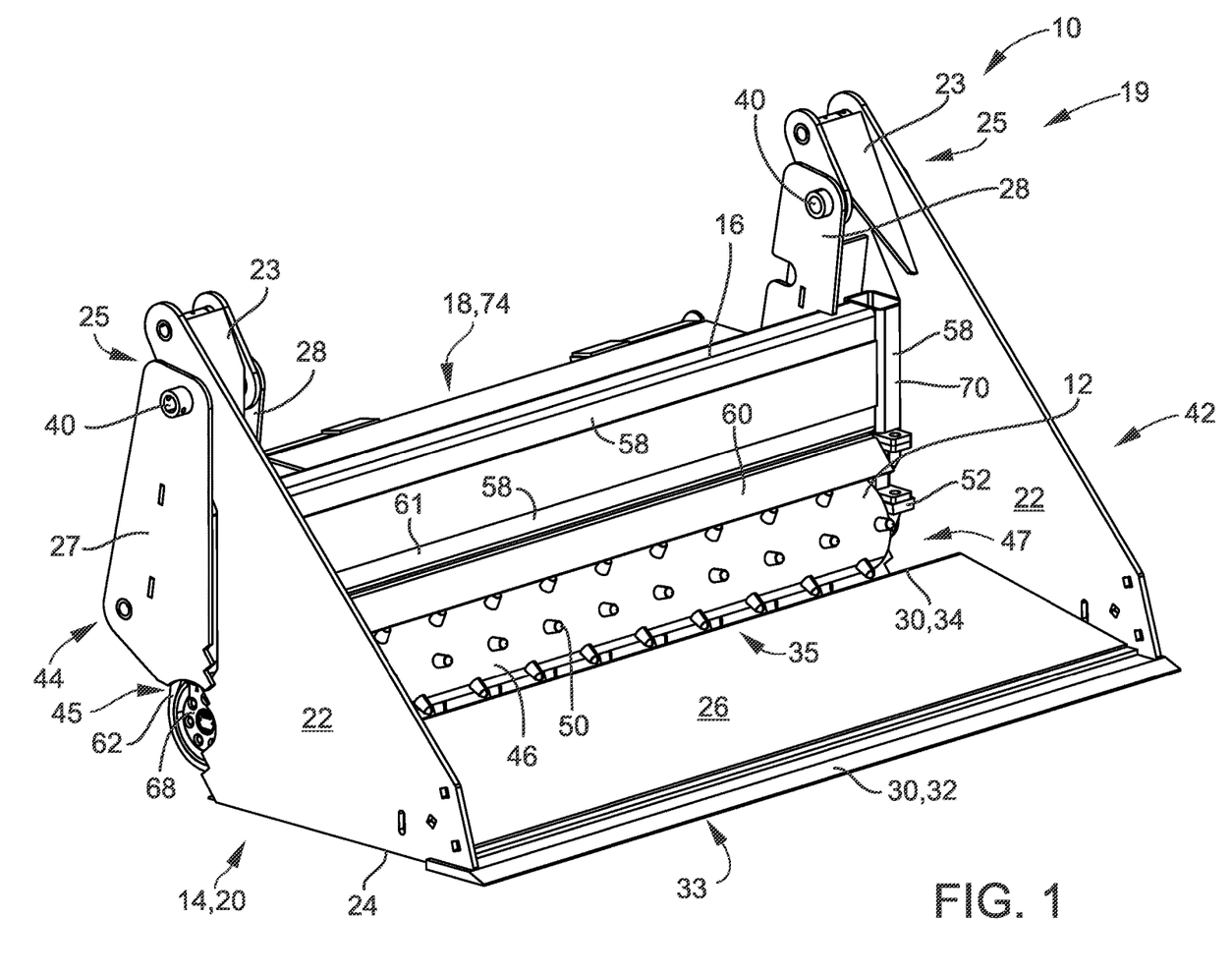
FIG. 1 is a front perspective view of the disclosed power rake and multi-purpose bucket combo attachment according to select embodiments of the disclosure.
Figure 2:
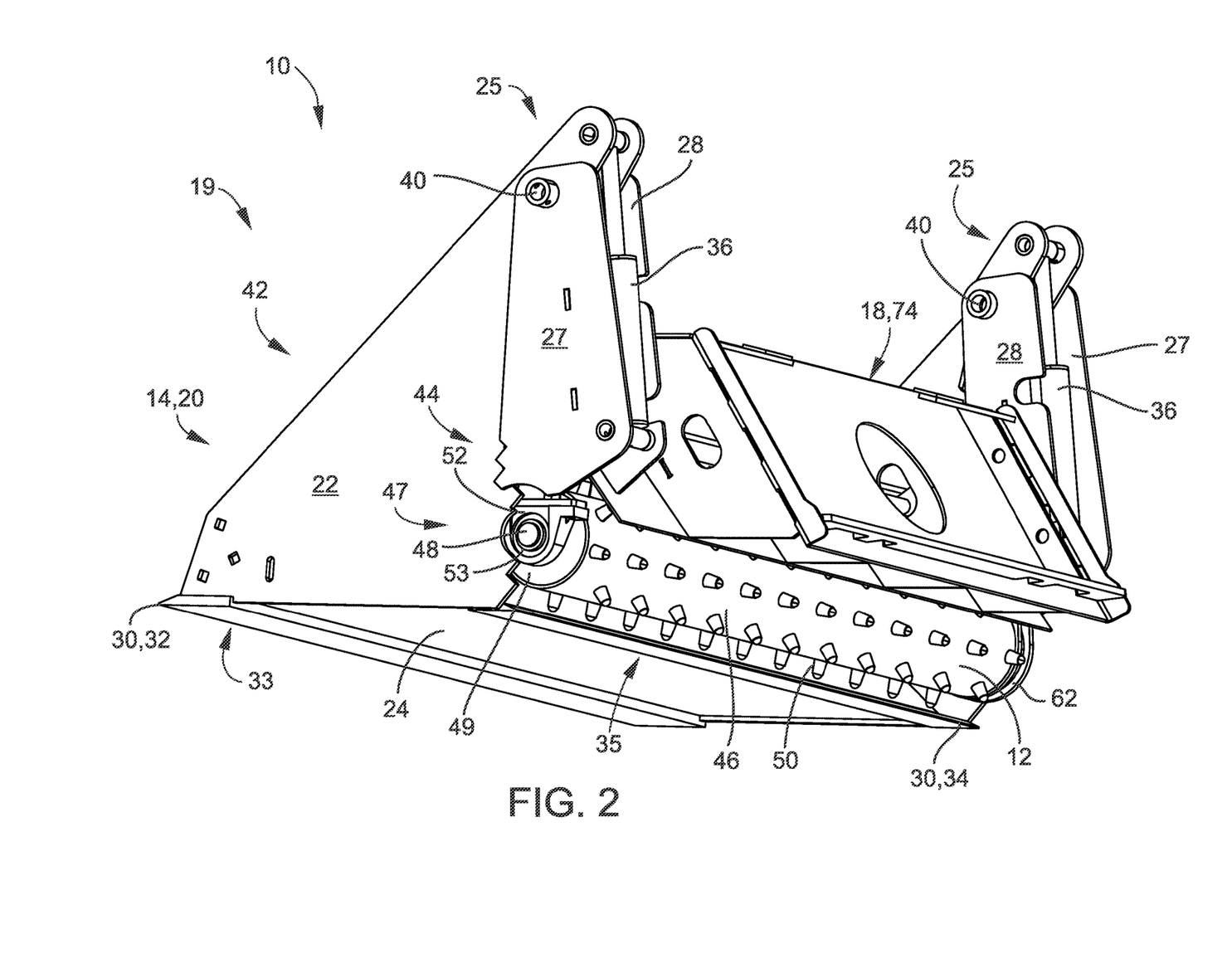
FIG. 2 is a bottom back perspective view of the power rake and multi-purpose bucket combo attachment of FIG. 1.
Figure 3:
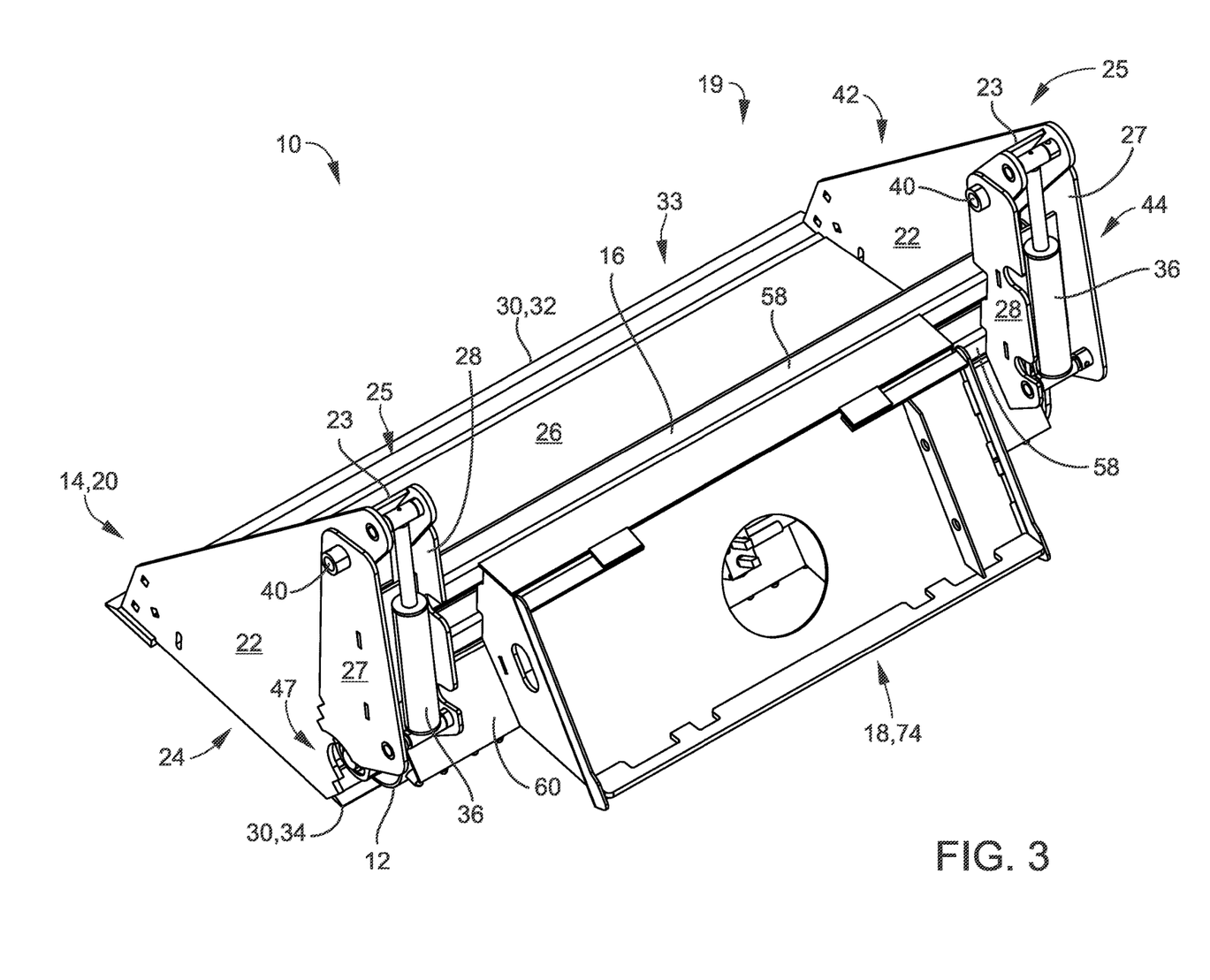
FIG. 3 is a top back perspective view of the power rake and multi-purpose bucket combo attachment of FIG. 1.
Figure 4:
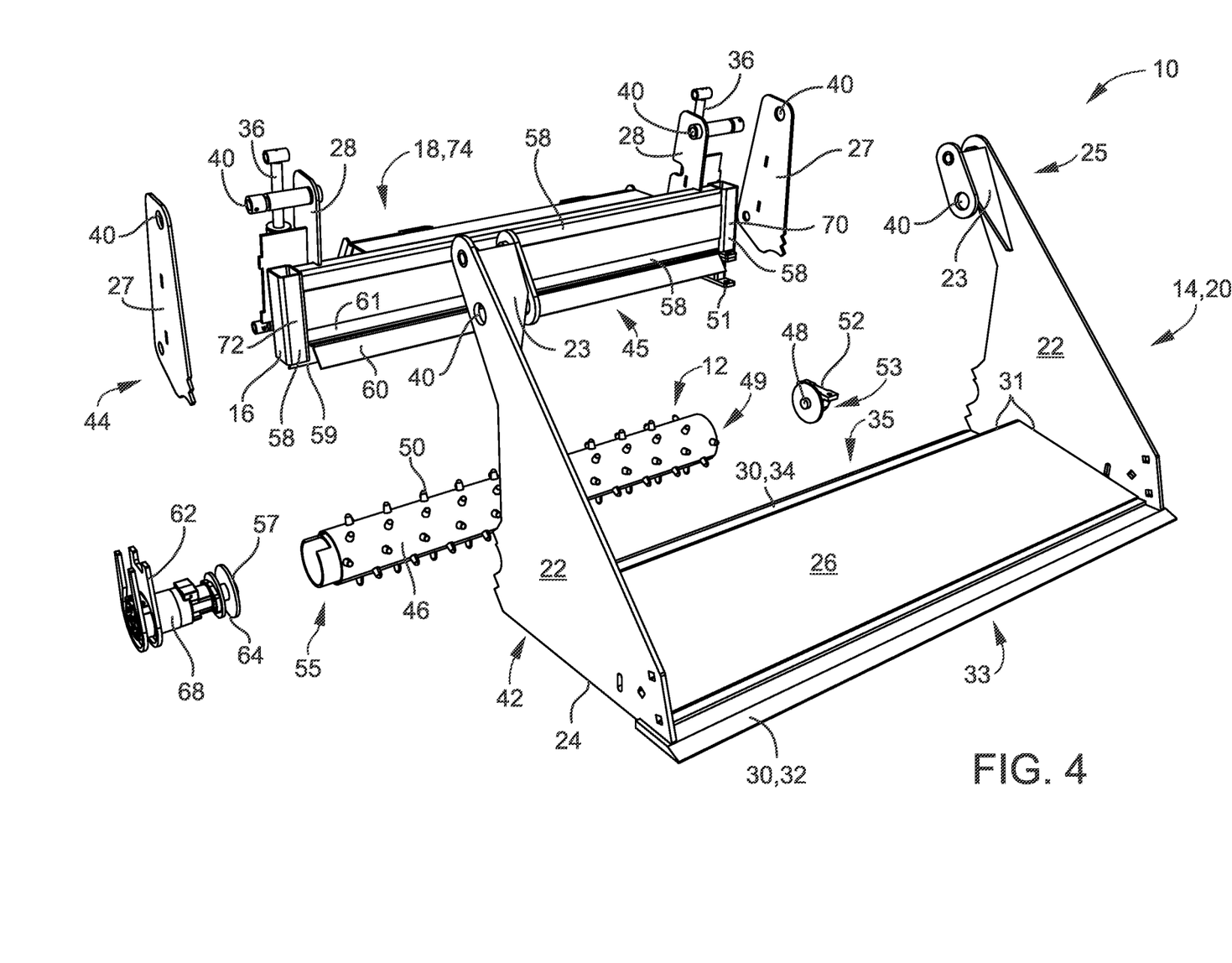
FIG. 4 is a front partially disassembled perspective view of the power rake and multi-purpose bucket combo attachment of FIG. 1.
Figures 5A, 5B:
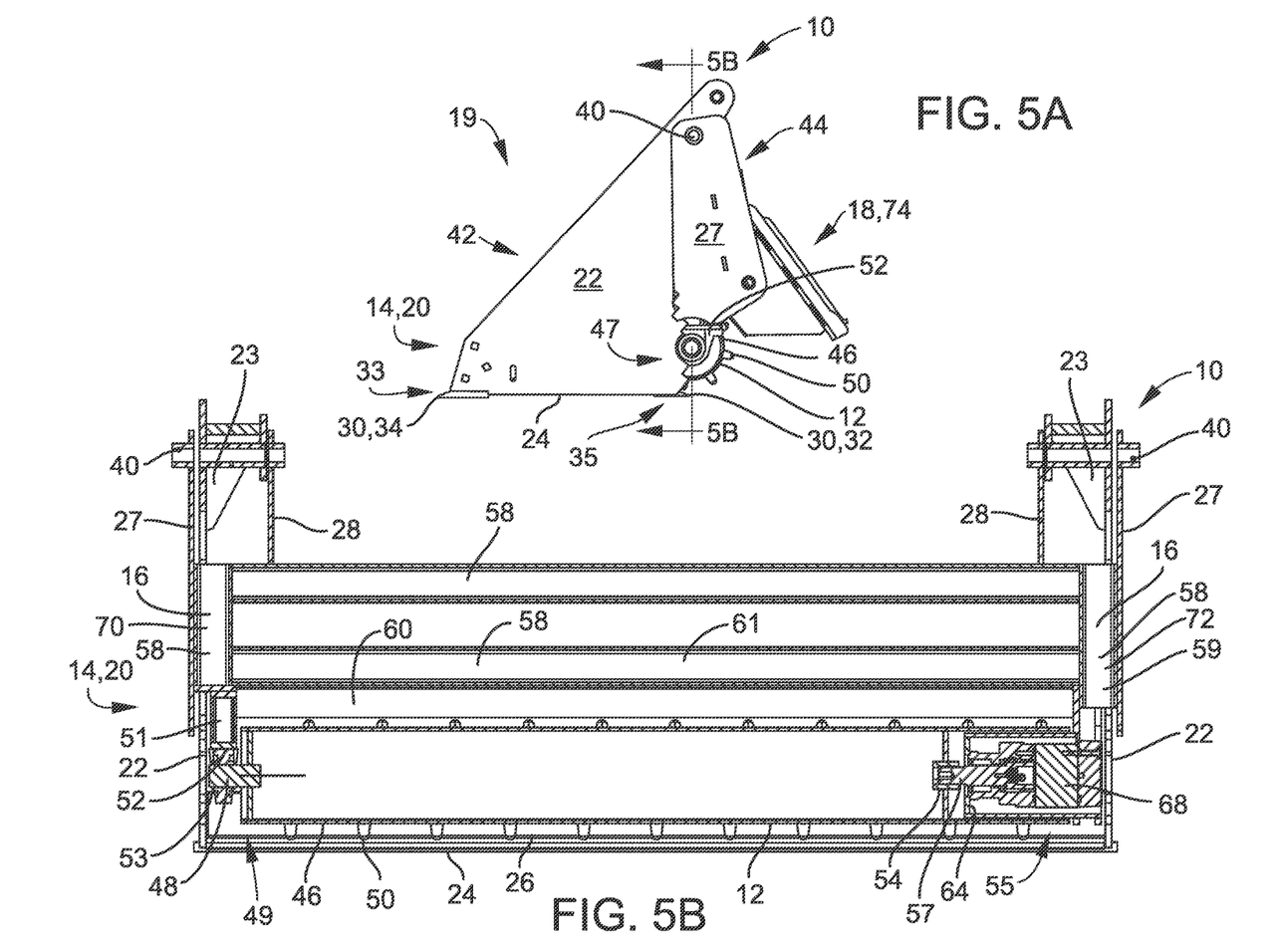
FIG. 5A is a right side view of the power rake and multi-purpose bucket combo attachment of FIG. 1.
FIG. 5B is a cross-sectional view of the power rake and multi-purpose bucket combo attachment of FIG. 1 across the cross-sectional lines shown in FIG. 5A.
Figure 5C:
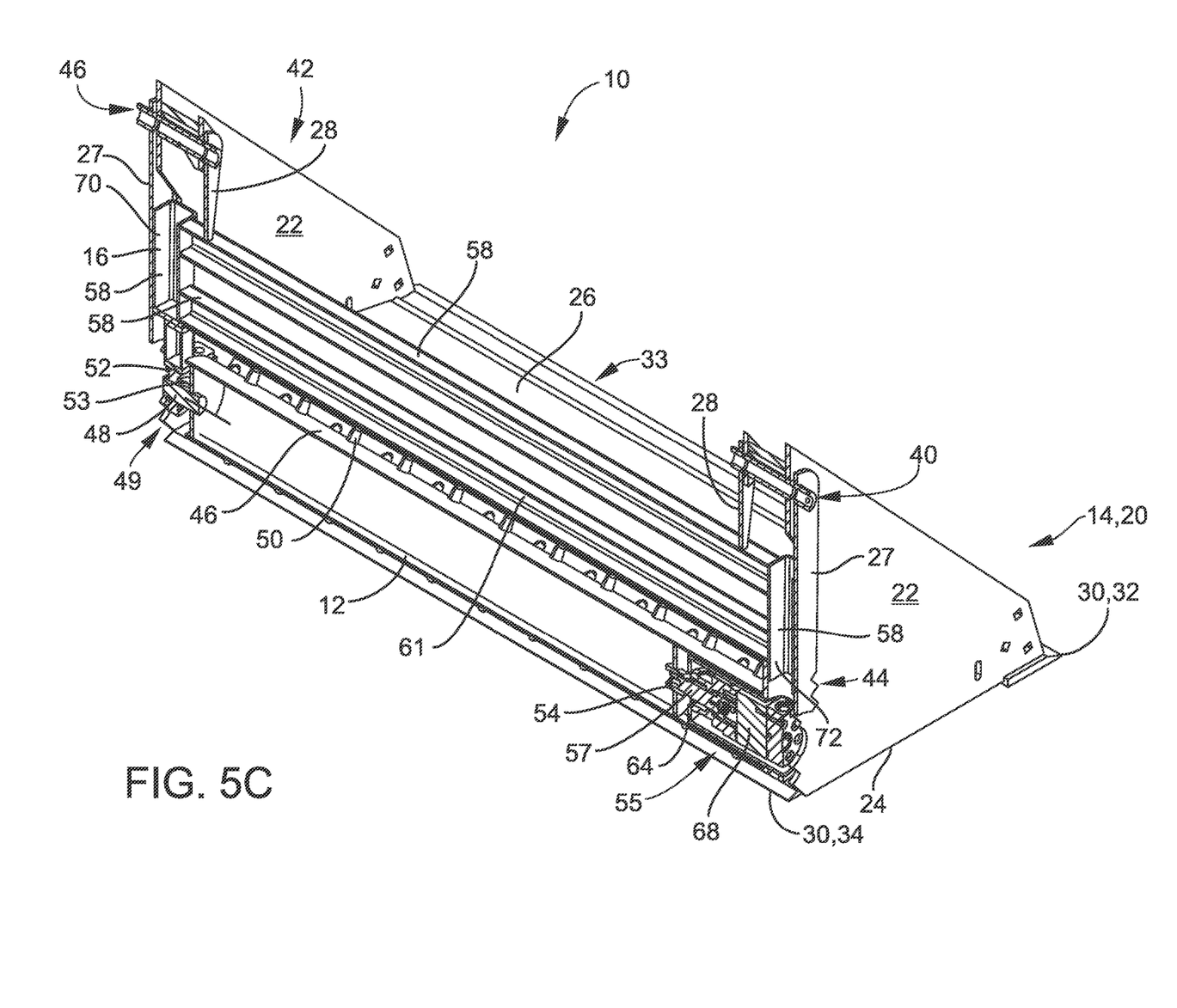
FIG. 5C is a cross-sectional perspective view of the power rake and multi-purpose bucket combo attachment of FIG. 1 across the cross-sectional lines shown in FIG. 5A.
Figure 6A:
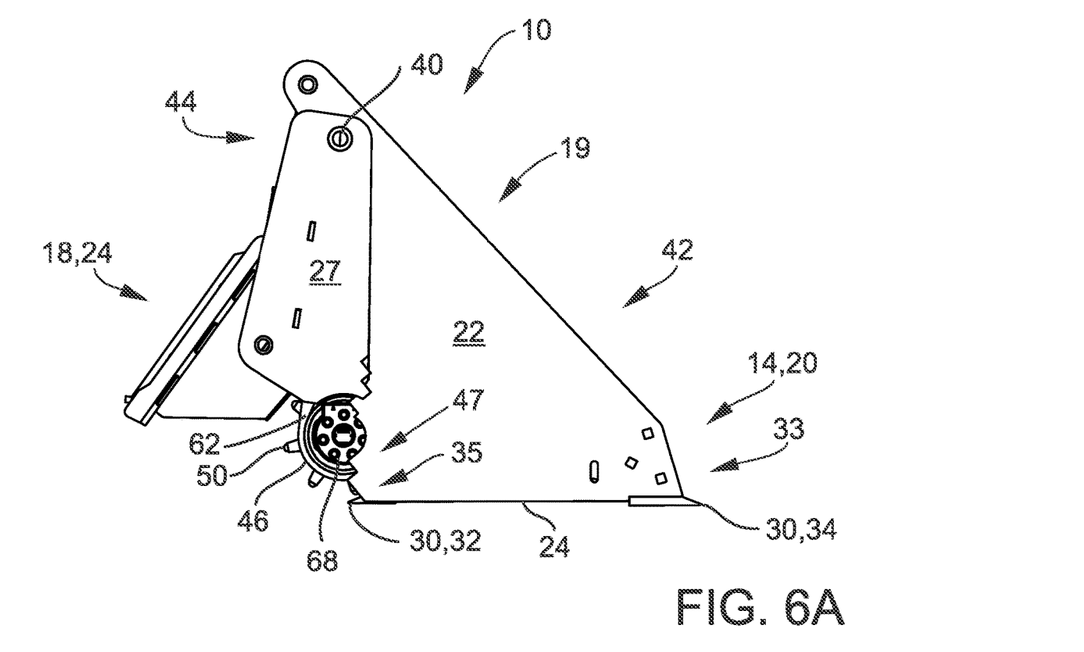
FIG. 6A is a left side view of the power rake and multi-purpose bucket combo attachment of FIG. 1.
Figure 6B:
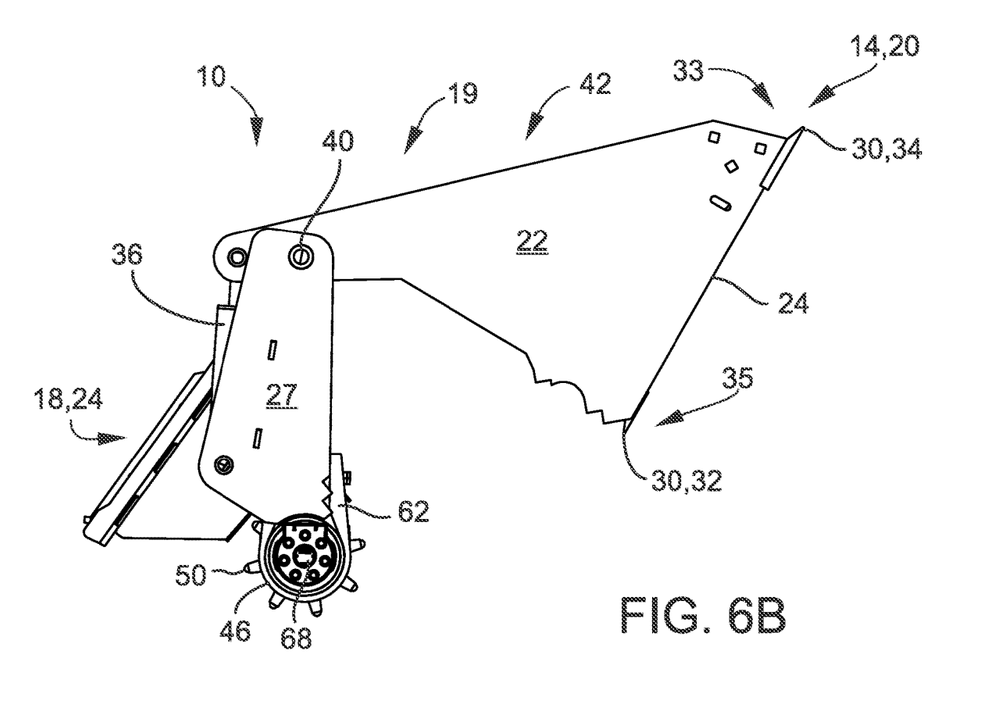
FIG. 6B another left side view of the power rake and multi-purpose bucket combo attachment of FIG. 1 with the front portion of the multi-purpose bucket hinged up and away from the back portion of the multi-purpose bucket.

Multi-purpose bucket 14 may be included with attachment 10. Multi-purpose bucket 14 may be configured to dig, scoop, lift, carry, clamp, pinch, hold, the like, and/or combinations thereof. As such, in select possibly preferred embodiments, multi-purpose bucket 14 can be configured to dig, scoop, lift, carry, clamp, pinch and hold. In select embodiments, multi-purpose bucket 14 configured to dig, scoop, lift, carry, clamp, pinch and hold may be 4-N-1 bucket 20. Multi-purpose bucket 14 may include back portion 44 and front portion 42. Back portion 44 may be affixed to frame 16, and thus controlled by the movement of plate 18 attached to loader machine 17. Front portion 42 may be pivotally connected to back portion 44 at pivot point 40. In select embodiments, hydraulic cylinders 36 may be included in multi-purpose bucket 14 of attachment 10. Hydraulic cylinders 36 may be configured to control the movement of front portion 42 relative to back portion 44 about pivot point 40, like as shown in the closed configuration as shown FIG. 6A versus the open configuration shown in FIG. 6B. Hydraulic cylinders 36 may be connected to loader machine 17 as with standard hydraulic attachments. Front portion 42 of multi-purpose bucket 14 may include sides 22, bucket bottom 24 and inner bottom 26. In select embodiments, sides 22 may have top gusset 23 configured for strengthening top portion 25 of sides 22 with pivot point 40. Bucket bottom 24 may have two cutting edges 30. In select embodiments, the two cutting edges 30 can include front cutting edge 32 at front 33 of bucket bottom 24, and rear cutting edge 34 at rear 35 of bucket bottom 24. In other select embodiments, bottom gusset 31 may also be included and positioned between front cutting edge 32 and rear cutting edge 34 configured for strengthening bucket bottom 24 between front cutting edge 32 and rear cutting edge 34. Bottom gusset 31 may create an angle on inner bottom 26 of multi-purpose bucket 14, as best shown in FIG. 4. As an optional feature, in select embodiments, bucket bolt-on side edges 38 may be included with multi-purpose bucket 14. See FIG. 7A. Bucket bolt-on side edges 38 may be on the front portion and may be configured for gripping. In other select embodiments, back portion 44 of multi-purpose bucket 14 may include inner back 28, and outer back 27. In these select embodiments, hydraulic cylinders 36 may be positioned between inner back 28 and outer back 27 of back portion 44 of multi-purpose bucket 14.

Power rake drum 12 may be included with attachment 10. Power rake drum 12 may be configured to spin and rotate on attachment 10 for acting like a powered rake or a Harley rake. Power rake drum 12 may be any desired shape or size of a powered type rake, a Harley type rake, or the like. As shown in the Figures, in select embodiments of the disclosed power rake and multi-purpose bucket combo attachment 10, power rake drum 12 may include pipe 46. Pipe 46 may have a plurality of teeth 50. Shaft 48 may be at first end 49 of pipe 46, as best shown in FIG. 4. Shaft 48 may be configured to spin in bearing plate 52 with bearing housing 53. Bearing plate 52 may be positioned on bottom 45 of first side 51 of frame 16. Splined bushing 54 may be positioned inside hollow second end 55 of pipe 46. Splined bushing 54 may be configured to attach to splined rod 57 of hydraulic motor 68. Hydraulic motor 68 may be configured to spin power rake drum 12. Hydraulic motor 68 may be positioned on bottom 45 of second side 59 of frame 16 in motor cradle 62. Motor cradle 62 may be configured to secure hydraulic motor 68 to frame 16 and inside hollow second end 55 of pipe 46. Hollow second end 55 of pipe 46 may be sealed with round seals 64 on splined rod 57 of hydraulic motor 68 configured to seal to the inside of pipe 46.

Figure 7A:
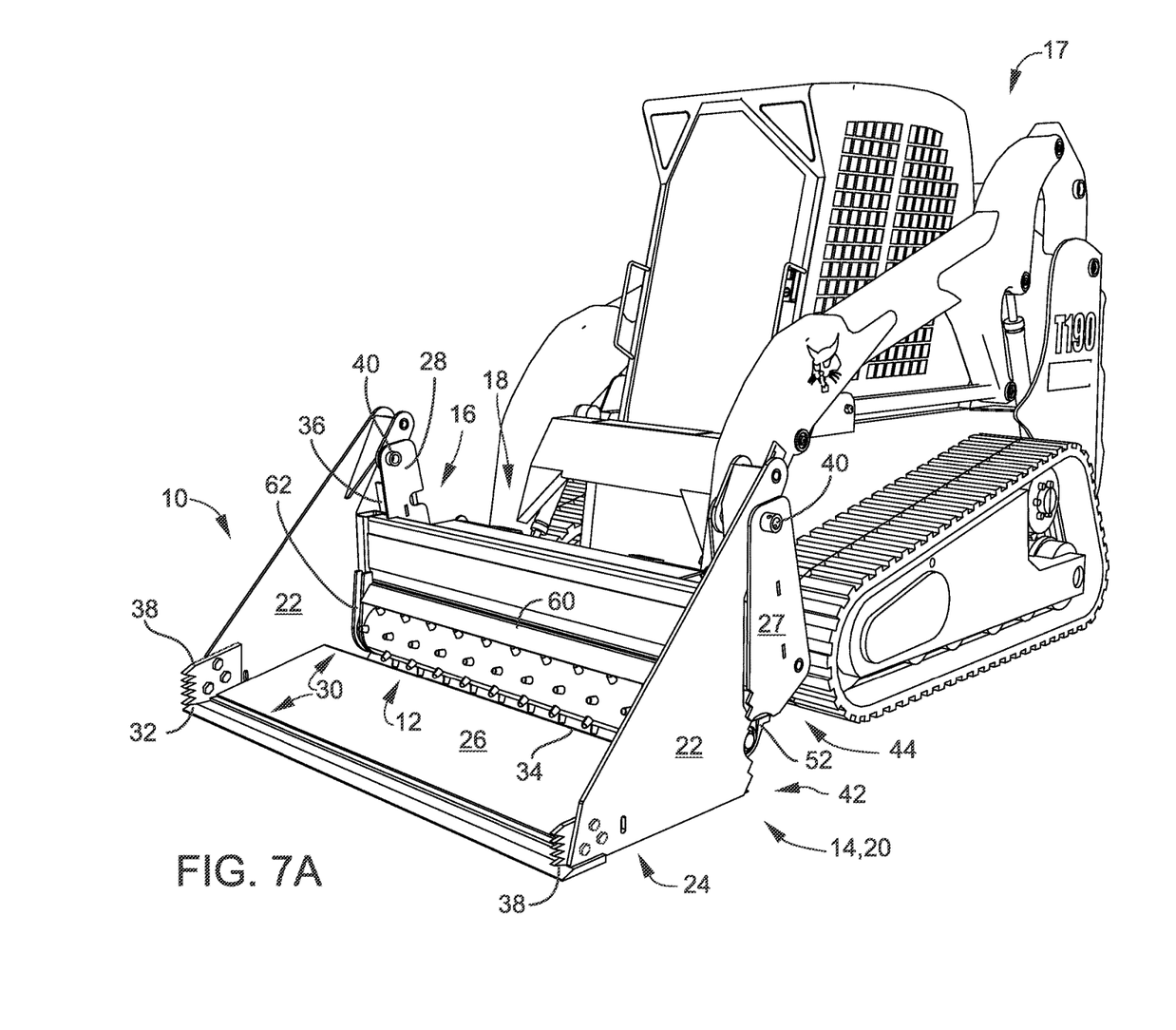
FIG. 7A is an environmental front perspective view of a loader with the disclosed power rake and multi-purpose bucket combo attachment attached thereto according to select embodiments of the instant disclosure with the multi-purpose bucket closed for use as a 4-N-1 bucket.
Figure 7B:
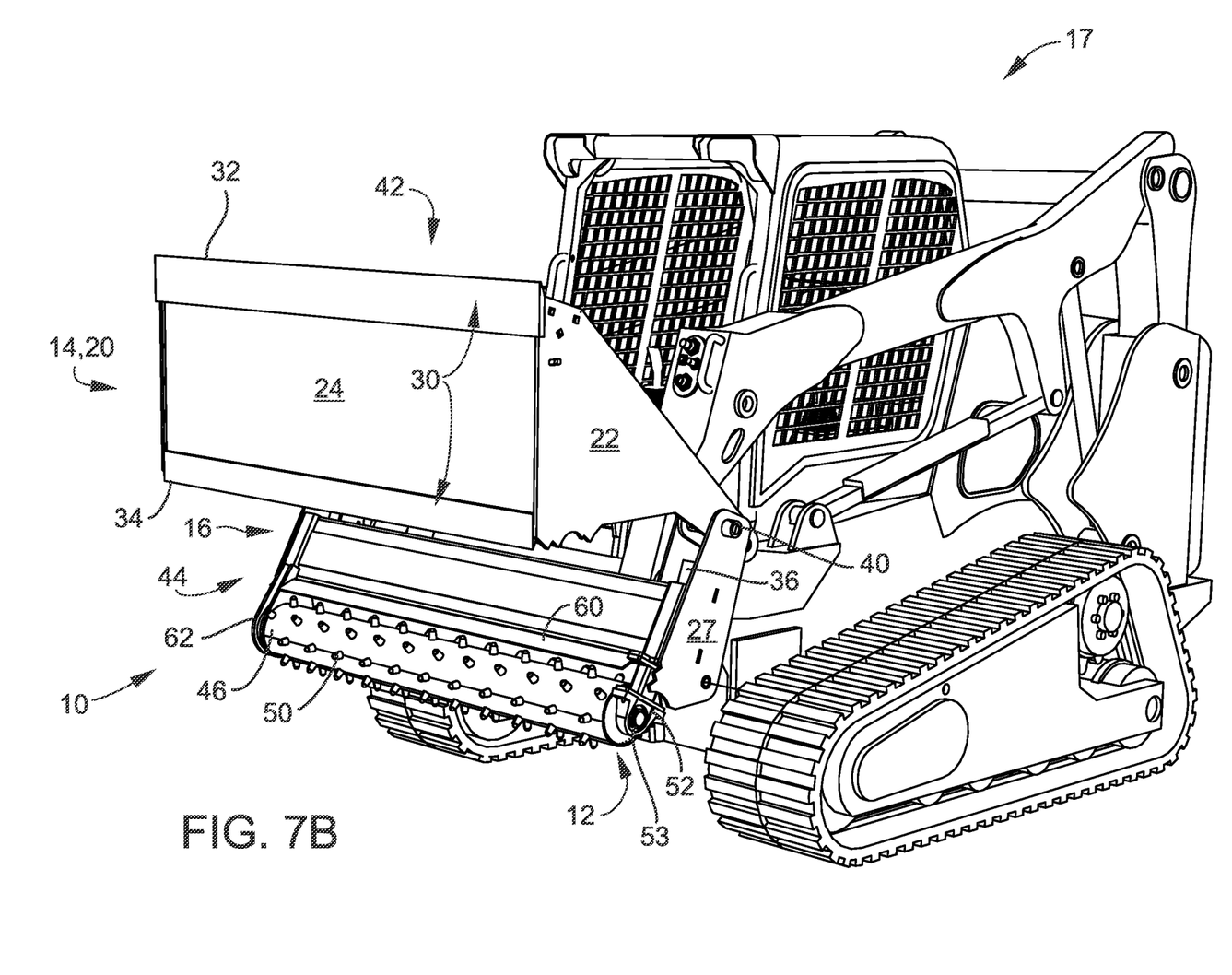
FIG. 7B is another environmental front perspective view of a loader with the disclosed power rake and multi-purpose bucket combo attachment attached thereto of FIG. 7A with the front portion of the multi-purpose bucket hinged up and away from the back portion of the multi-purpose bucket for use with the power rake drum.

Frame 16 may be included with attachment 10. Frame 16 may be configured to hold power rake drum 12 and multi-purpose bucket 14 in positions for operation on loader machine 17, like on a skid steer loader, as shown in FIGS. 7A and 7B. Frame 16 may also include plate 18 attached thereto. Plate 18 may be configured for attachment to loader machine 17. In select embodiments, plate 18 may be standard quick attachment plate 74, as show in the Figures. In select embodiments, frame 16 may include steel tubing 58, adjustable debris stopper 60, bearing plate 52, and motor cradle 62. Adjustable debris stopper 60 may be movably attached on bottom tubing 61 of frame 16 configured for stopping debris from flying while power rake drum 12 is in use. Bearing plate 52 with bearing housing 53 may be positioned on bottom 45 of first side tube 70 configured for holding shaft 48 at first end 49 of power rake drum 12 while allowing shaft 48 and power rake drum 12 to spin. Motor cradle 62 may be positioned at bottom 45 of second side tube 72 of frame 16. Motor cradle 62 may be configured to hold hydraulic motor 68 configured to spin power rake drum 12.

Wherein, the power rake and multi-purpose bucket combo attachment 10 may be configured to combine power rake drum 12 and multi-purpose bucket 14 that can dig, scoop, lift, carry, clamp, pinch or hold in single attachment 19. Whereby, the power rake multi-purpose bucket combo attachment may provide operations of both the power rake drum and the multi-purpose bucket.

Power rake drum 12 may be positioned at various desired locations within or around multi-purpose bucket 14. In select embodiments of the disclosed power rake and multi-purpose bucket combo attachment 10, as shown in the Figures, power rake drum 12 may be positioned approximate bottom structure 45 of frame 16 below back portion 44 of multi-purpose bucket 14. In these embodiments, power rake drum 12 may be positioned at rear-bottom portion 47 of multi-purpose bucket 14. However, the disclosure is not so limited, and other positions or locations of power rake drum 12 are contemplated by the instant disclosure and may be desired.

In select embodiments of the disclosed power rake and multi-purpose bucket combo attachment 10, loader machine 17 may be a skid steer loader (as shown in FIGS. 7A and 7B), a tractor, a compact tractor, a compact track loader, a mini skid steer, a mini excavator, or the like. As such, attachment 10 may be sized to any configuration or design for fitting such loader machines.

Referring to FIGS. 7A and 7B, in another aspect, the instant disclosure embraces loader machine 17 with the disclosed power rake and multi-purpose bucket combo attachment 10. Referring specifically to FIG. 7A, in use, the disclosed power rake and multi-purpose bucket combo attachment 10 may be used as a standard bucket, or opened up and used as 4-N-1 bucket 20, where it can open and close front portion 42 from back portion 44 of multi-purpose bucket 14 where it can thereby be configured to dig, scoop, lift, carry, clamp, pinch, hold, the like, and/or combinations thereof. Referring now specifically to FIG. 7B, in use, the disclosed power rake and multi-purpose bucket combo attachment 10 may be used as a power rake, Harley rake, or the like, by opening front portion 42 from back portion 44 of multi-purpose bucket 14 where power rake drum 12 is exposed at the bottom of frame 16 and hydraulic motor can spin pipe 46 with teeth 50 for use as the power rake, Harley rake, or the like.

In sum, the instant disclosure of power rake and multi-purpose bucket combo attachment 10 combines the operations of a power rake and an attachment that can dig, scoop, lift, carry, clamp, pinch and/or hold, like a 4N1 bucket, so that time can be minimized on jobsite. Attachment 10 could allow an operator to use functions of both the power rake and an attachment that can dig, scoop, lift, carry, clamp, pinch and/or hold, like a 4N1 bucket attachment, without having to physically switch attachments. Attachment 10 thus combines a power rake and an attachment that can dig, scoop, lift, carry, clamp, pinch and/or hold, like 4N1 bucket attachment 20, so that the main operations of both attachments can be utilized with only one attachment 19. Attachment 10 may include the main components of a power rake, the drum 12 (teeth 50, shaft 48, and pipe 46), frame 16, bearings, direct drive hydraulic motor 68 and the main parts of the other attachment that can dig, scoop, lift, carry, clamp, pinch and/or hold, like 4N1 bucket attachment 20. For example, the 4N1 bucket 20 may have the front end of the bucket along with the inner and outer back and hydraulic cylinders 36. Attachment may cultivate/grade/and sift the ground like a typical power rake but has the added benefits of being able to dig, scoop, carry, and clamp material. In particular, this may be, but is clearly not limited thereto, being useful in finish grading/landscaping, when an operator will use a power rake to prep ground for sod or to be seeded, while he rakes, piles of debris are created and must be picked up before the job can be finished. Prior to the instant disclosure, to pick up the piles the operator would have to remove the power rake and hook up to a bucket, then after removing the piles, reattach the power rake to go back over the tracks created by the machine while picking up the piles. The provided power rake and multi-purpose bucket combo attachment would simply be able to, after raking, clamp down on the pile and remove it.

Attachment 10 may work by using the machines hydraulics to power the drum 12, and the hydraulic cylinders 36 on the bucket. A valve could be used so that they could work independent of one another.

A feature of the present disclosure is its ability to be used as a power rake, it can be used as any power rake will, the advantage lies in its ability to close the attachment that can dig, scoop, lift, carry, clamp, pinch and/or hold, like a 4N1 bucket, down on the pile of debris that the power rake created in use, and simply pick this debris up and carry it elsewhere. With previous power rakes an operator would use the power rake, creating piles of debris around the work area, then switch to a bucket to pick up the piles, then dispose of them, and then switch back to the power rake to clean up tracks left by the machine, a timely process. With the disclosed power rake and multi-purpose bucket combo attachment 10 the entire process can be done without having to switch attachments and reworking areas.

Another feature of the present disclosure is its ability to operate as an attachment that can dig, scoop, lift, carry, clamp, pinch and/or hold, like a 4N1 bucket. For example, as shown herein, this attachment can be used as a 4N1 bucket in that it can dig, carry, and clamp down onto objects. The power rake roller would then add the benefits of cultivating and grading the ground better than what a traditional 4N1 bucket would be able to do.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A power rake and multi-purpose bucket combo attachment comprising:
   a power rake drum;
   a multi-purpose bucket configured to dig, scoop, lift, carry, clamp, pinch or hold; and
   a frame configured to hold the power rake drum and the multi-purpose bucket in positions for operation on a loader machine, the frame also includes a plate configured for attachment to the loader machine;
   wherein the power rake drum including:
      a pipe with a plurality of teeth;
      a shaft at a first end of the pipe configured to spin in a bearing plate with a bearing housing, where the bearing plate is positioned on a bottom of a first side of the frame;
      a splined bushing inside a hollow second end of the pipe configured to attach to a splined rod of a hydraulic motor configured to spin the power rake drum, where the hydraulic motor is positioned on the bottom of a second side of the frame in a motor cradle configured to secure the hydraulic motor to the frame and inside the hollow second end of the pipe, the hollow second end of the pipe is sealed with round seals on the splined rod of the hydraulic motor configured to seal to the inside of the pipe; and
   wherein, the power rake and multi-purpose bucket combo attachment is configured to combine the power rake drum and the multi-purpose bucket, whereby the power rake multi-purpose bucket combo attachment provides operations of both the power rake drum and the multi-purpose bucket.

2. The power rake and multi-purpose bucket combo attachment of claim 1, wherein the multi-purpose bucket is configured to dig, scoop, lift, carry, clamp, pinch and hold.

3. The power rake and multi-purpose bucket combo attachment of claim 2, wherein the multi-purpose bucket configured to dig, scoop, lift, carry, clamp, pinch and hold is a 4-N-1 bucket.

4. The power rake and multi-purpose bucket combo attachment of claim 1, wherein the multi-purpose bucket including:
   a back portion affixed to the frame; and
   a front portion pivotally connected to the back portion at a pivot point.

5. The power rake and multi-purpose bucket combo attachment of claim 4, wherein the multi-purpose bucket further including hydraulic cylinders configured to control movement of the front portion relative to the back portion about the pivot point.

6. The power rake and multi-purpose bucket combo attachment of claim 5, wherein the back portion including:
   an inner back; and
   an outer back.

7. The power rake and multi-purpose bucket combo attachment of claim 6, wherein the hydraulic cylinders are positioned between the inner back and the outer back.

8. The power rake and multi-purpose bucket combo attachment of claim 4, wherein the front portion including:
   sides with a top gusset configured for strengthening a top portion of the sides with the pivot point;
   a bucket bottom with two cutting edges; and
   an inner bottom.

9. The power rake and multi-purpose bucket combo attachment of claim 8, wherein the two cutting edges including:
   a front cutting edge at the front of the bucket bottom;
   a rear cutting edge at the rear of the bucket bottom; and
   a bottom gusset positioned between the front cutting edge and the rear cutting edge configured for strengthening the bucket bottom between the front cutting edge and the rear cutting edge.

10. The power rake and multi-purpose bucket combo attachment of claim 8, wherein the front portion further including bucket bolt-on side edges configured for gripping.

11. The power rake and multi-purpose bucket combo attachment of claim 4, wherein the power rake drum is positioned approximate a bottom structure of the frame below the back portion, where the power rake drum is positioned at a rear-bottom portion of the multi-purpose bucket.

12. The power rake and multi-purpose bucket combo attachment of claim 1, wherein the frame including:
   steel tubing;
   an adjustable debris stopper movably attached on a bottom tubing of the frame configured for stopping debris from flying while the power rake drum is in use;
   a bearing plate with a bearing housing positioned on a bottom of a first side tube configured for holding a shaft at a first end of the power rake drum while allowing the shaft and the power rake drum to spin; and
   a motor cradle positioned at a bottom of a second side tube of the frame, the motor cradle configured to hold a hydraulic motor configured to spin the power rake drum.

13. The power rake and multi-purpose bucket combo attachment of claim 1, wherein the plate configured for attachment to the loader machine on the frame is a standard quick attachment plate.

14. The power rake and multi-purpose bucket combo attachment of claim 1, wherein the loader machine is a skid steer loader, a tractor, a compact tractor, a compact track loader, a mini skid steer, or a mini excavator.

15. A power rake and multi-purpose bucket combo attachment comprising:
   a power rake drum including:
      a pipe with a plurality of teeth;
      a shaft at a first end of the pipe configured to spin in a bearing plate with a bearing housing, where the bearing plate is positioned on a bottom of a first side of a frame; and
      a splined bushing inside a hollow second end of the pipe configured to attach to a splined rod of a hydraulic motor configured to spin the power rake drum, where the hydraulic motor is positioned on the bottom of a second side of the frame in a motor cradle configured to secure the hydraulic motor to the frame, the hollow second end of the pipe is sealed with round seals on the splined rod of the hydraulic motor configured to seal to the inside of the pipe;
   a multi-purpose bucket configured to dig, scoop, lift, carry, clamp, pinch and hold and is a 4-N-1 bucket, the multi-purpose bucket comprising:
      a back portion affixed to the frame, the back portion including:
         an inner back;
         an outer back;
      a front portion pivotally connected to the back portion at a pivot point, the front portion including:
         sides with a top gusset configured for strengthening a top portion of the sides with the pivot point;
         a bucket bottom with two cutting edges including a front cutting edge at the front of the bucket bottom, a rear cutting edge at the rear of the bucket bottom, and a bottom gusset positioned between the front cutting edge and the rear cutting edge configured for strengthening the bucket bottom between the front cutting edge and the rear cutting edge; and an inner bottom; and hydraulic cylinders configured to control movement of the front portion relative to the back portion about the pivot point, the hydraulic cylinders are positioned between the inner back and the outer back of the back portion; and the frame is configured to hold the power rake drum and the multi-purpose bucket in positions for operation on a loader machine, the frame includes a standard quick attachment plate configured for attachment to the loader machine, the frame including:

steel tubing;

an adjustable debris stopper movably attached on a bottom tubing of the frame configured for stopping debris from flying while the power rake drum is in use;

the bearing plate with the bearing housing positioned on a bottom of a first side tube; and the motor cradle positioned at a bottom of a second side tube of the frame;

wherein the power rake drum is positioned approximate a bottom structure of the frame below the back portion, where the power rake drum is positioned at a rear-bottom portion of the multi-purpose bucket;

wherein, the power rake and multi-purpose bucket combo attachment is configured to combine the power rake drum and the multi-purpose bucket that can dig, scoop, lift, carry, clamp, pinch and hold in a single attachment, whereby the power rake and multi-purpose bucket combo attachment provides operations of both the power rake drum and the multi-purpose bucket;

wherein the loader machine is a skid steer loader, a tractor, a compact tractor, a compact track loader, a mini skid steer, or a mini excavator.

16. A loader machine with a power rake and multi-purpose bucket combo attachment comprising:

the loader machine;

the power rake and multi-purpose bucket combo attachment connected to the loader machine, where the power rake and multi-purpose bucket combo attachment including:

a power rake drum;

a multi-purpose bucket configured to dig, scoop, lift, carry, clamp, pinch or hold; and a frame configured to hold the power rake drum and the multi-purpose bucket in positions for operation on the loader machine, the frame also includes a plate configured for attachment to the loader machine;

wherein the power rake drum including:

a pipe with a plurality of teeth;

a shaft at a first end of the pipe configured to spin in a bearing plate with a bearing housing, where the bearing plate is positioned on a bottom of a first side of the frame;

a splined bushing inside a hollow second end of the pipe configured to attach to a splined rod of a hydraulic motor configured to spin the power rake drum, where the hydraulic motor is positioned on the bottom of a second side of the frame in a motor cradle configured to secure the hydraulic motor to the frame and inside the hollow second end of the pipe, the hollow second end of the pipe is sealed with round seals on the splined rod of the hydraulic motor configured to seal to the inside of the pipe; and wherein, the power rake and multi-purpose bucket combo attachment is configured to combine the power rake drum and the multi-purpose bucket, whereby the power rake multi-purpose bucket combo attachment provides operations of both the power rake drum and the multi-purpose bucket on the loader machine.

17. The loader machine of claim 16, wherein the multi-purpose bucket is a 4-N-1 bucket configured to dig, scoop, lift, carry, clamp, pinch and hold.

18. The loader machine of claim 16, wherein the multi-purpose bucket including:

a back portion affixed to the frame;

a front portion pivotally connected to the back portion at a pivot point;

hydraulic cylinders configured to control movement of the front portion relative to the back portion about the pivot point wherein the power rake drum is positioned approximate a bottom structure of the frame below the back portion, where the power rake drum is positioned at a rear-bottom portion of the multi-purpose bucket.

19. The loader machine of claim 16 being a skid steer loader, a tractor, a compact tractor, a compact track loader, a mini skid steer, or a mini excavator.

* * * * *